United States Patent
Han et al.

(10) Patent No.: US 7,147,968 B2
(45) Date of Patent: Dec. 12, 2006

(54) POSITIVE ELECTRODE FOR LITHIUM-SULFUR BATTERY

(75) Inventors: Ji-Seong Han, Kyungsangnam-do (KR); Su-Suk Choi, Cheonan (KR); Seung-Hee Park, Pohang (KR); Yun-Suk Choi, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 371 days.

(21) Appl. No.: 10/310,822

(22) Filed: Dec. 6, 2002

(65) Prior Publication Data

US 2003/0143462 A1    Jul. 31, 2003

(30) Foreign Application Priority Data

Jan. 22, 2002   (KR) .......................... 2002-0003625

(51) Int. Cl.
*H01M 4/58*    (2006.01)
(52) U.S. Cl. .................. 429/218.1; 429/217; 429/232; 429/233; 429/215; 252/182.1; 252/519.4; 252/519.14
(58) Field of Classification Search ............. 429/218.1, 429/217, 232, 231.95, 233, 215; 252/182.1, 252/519.14, 519.4
See application file for complete search history.

(56) References Cited

U.S. PATENT DOCUMENTS

| 4,833,048 | A |   | 5/1989 | Dejonghe et al. |   |
|---|---|---|---|---|---|
| 4,917,976 | A | * | 4/1990 | Wakihara et al. | 429/220 |
| 5,162,175 | A |   | 11/1992 | Visco et al. |   |
| 5,523,179 | A |   | 6/1996 | Chu |   |
| 5,529,860 | A | * | 6/1996 | Skotheim et al. | 429/213 |
| 5,814,420 | A |   | 9/1998 | Chu |   |
| 6,013,390 | A | * | 1/2000 | Kimiya et al. | 429/206 |
| 6,110,619 | A | * | 8/2000 | Zhang et al. | 429/213 |
| 6,306,546 | B1 | * | 10/2001 | LaFleur et al. | 429/324 |
| 6,358,643 | B1 | * | 3/2002 | Katz et al. | 429/105 |
| 6,566,006 | B1 | * | 5/2003 | Cheng et al. | 429/217 |
| 6,849,360 | B1 | * | 2/2005 | Marple | 429/217 |
| 2003/0113624 | A1 | * | 6/2003 | Kim et al. | 429/213 |

OTHER PUBLICATIONS

Rauh, R.D., et al., "A Lithium/Dissolved Sulfur Battery with an Organic Electrolyte", pp. 523-252. Apr. 1975.
Peled, E., et al., Lithium-Sulfur Battery: Evaluation of Dioxolane-Based Electrolytes, J. Electrochem. Soc., vol. 136, No. 6, Jun. 1989, pp. 1621-1625.
Oyama, N. et al., Dimercaptan-polyaniline Composite Electrodes for Lithium Batteries with High Energy Density, Nature, vol. 373, Feb. 1995, pp. 598-600.

* cited by examiner

*Primary Examiner*—Laura Weiner
(74) *Attorney, Agent, or Firm*—Stein, McEwen & Bui, LLP

(57) ABSTRACT

A positive electrode for a lithium-sulfur battery includes a positive active material including a sulfur-based compound, an electrically conductive material, an agent for increasing viscosity, and a binder. The agent is selected from a cellulose-based compound, an ionically conductive polymer, and a mixture thereof. The binder includes styrene-butadiene rubber.

19 Claims, 9 Drawing Sheets

POSITIVE ELECTRODE FOR LITHIUM-SULFUR BATTERY

CROSS REFERENCE TO RELATED APPLICATION

This application claims the benefit of Korean Application No. 2002-3625, filed in the Korean Intellectual Property Office on Jan. 22, 2002, the disclosure of which is incorporated herein by reference.

BACKGROUND OF THE INVENTION

1. Field of the Invention

The present invention relates to a positive electrode for a lithium-sulfur battery, and more particularly, to a positive electrode for a lithium-sulfur battery and which exhibits high energy density.

2. Description of the Related Art

Recently, the rapid development of smaller, lighter, and higher performance electronic and communication equipment has required the development of high performance and large capacity batteries to power such equipment. Lithium-sulfur batteries are of interest because they have the highest theoretical energy density, 2800 Wh/kg (1675 mAh/g), as compared to other batteries. In addition, sulfur is an abundant and inexpensive material, and is also environmentally-friendly.

Rauh (Rauh et al., J. Electrochemical Society, 126(4): 523 (April 1979)) discloses a carbon electrode and a sulfur-dissolved organic electrolyte. Peled (2) (Peled et al., J. Electrochemical Society, 136 (1989) 1621) discloses the use of various organic solvents. The cell consists of a lithium negative electrode, a porous catalytic current collector which is loaded with sulfur, and an organic solvent containing lithium polysulfide. However, a battery with high energy capacity cannot be fabricated with these methods due to the reaction between the organic solvent and the sulfur.

DeJonghe, Visco, and Oyama (DeJonghe, U.S. Pat. No. 4,833,048; Visco, U.S. Pat. No. 5,162,175; and Nature 373, 598–600, 1995 by Oyama) attempted to use an organo-sulfur positive electrode in batteries, but the organo-sulfur material has a poor theoretical capacity and a low reaction rate at room temperature.

U.S. Pat. Nos. 5,523,179 and 5,814,420 (Chu) teach an active sulfur (elemental sulfur, $S_8$) having the highest theoretical capacity. The active sulfur can provide electrodes with a high active material density and capacity density, which results in a high-capacity positive electrode (1675 mAh/g of sulfur). Positive electrodes disclosed in these patents include an electrically conductive material that permits electrons to move between the active sulfur (the electrochemically insulator), and the electrically conductive material. These patents also disclose an ionically conductive material that permits ions to move between the ionically conductive material and the active sulfur.

One of the requirements for a binder used in lithium-sulfur batteries is a high adherence. Where the binder has a poor adherence, there needs to be an increase in the amount of the binder used. An increase in the binder results in a consequent reduction in the amount of positive active material in the positive electrode, thereby deteriorating the capacity of the resulting battery. Another requirement is good stability at temperatures at which the battery is used. That is, the binder preferably has a high boiling point, as a low boiling point limits applications of the battery. A final requirement is that the binder exhibits no reactivity with an electrolyte.

SUMMARY OF THE INVENTION

It is an object of the present invention to provide a positive electrode for a lithium-sulfur battery with a good adherence binder to provide a lithium-sulfur battery having a high energy density.

It is another object to provide the positive electrode for a lithium-sulfur battery with a binder having a high boiling point and having no reactivity with an electrolyte.

Additional objects and advantages of the invention will be set forth in part in the description which follows and, in part, will be obvious from the description, or may be learned by practice of the invention.

These and other objects may be achieved with a positive electrode for a lithium-sulfur battery according to an embodiment of the invention which includes a positive active material, an electrically conductive material, and a styrene-based rubber binder.

According to an aspect of the invention, the positive active material includes sulfur, a sulfur-based compound, or a mixture thereof.

According to a further aspect of the invention, the positive electrode further includes an agent which increases viscosity and which is selected from a cellulose-based compound, an ionically conductive polymer, and a mixture thereof.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE EMBODIMENTS

Reference will now be made in detail to the present embodiments of the present invention, examples of which are illustrated in the accompanying drawings and specific Examples. The embodiments are described below in order to explain the present invention by referring to the figures and the specific Examples.

A positive electrode is produced by mixing a sulfur-based active material, a binder, and a conductive material in a suitable solvent so as to prepare an active material composition in the form of a slurry. The composition is coated on a collector and the coated collector is dried. The binder is soluble or is well distributed in the solvent. The binder helps to form a conductive network between the sulfur in the active material and the conductive material, and acts to firmly adhere the positive active material to the collector. The solvent used is a good solvent for the binder, but a poor solvent for the positive active material. That is, the solvent is one that dissolves the binder, but does not dissolve the positive active material.

As the amount of the positive active material increases, the capacity of the positive electrode increases. Thus, to increase the amount of the positive active material, the amount of the binder and the conductive material should be relatively reduced. For such a purpose, a new binder is required which has a better adherence than the conventional binder.

In the present invention, a new binder uses a styrene-based rubber which has excellent adherence, particularly styrene-butadiene rubber, in lithium-sulfur batteries. Owing to the excellent adherence of the styrene-based rubber, use of the styrene-butadiene rubber binder has been attempted in a negative electrode of nickel-hydrogen batteries and lithium ion batteries. However, the styrene-butadiene rubber is electrochemically unstable within working voltages of the nickel-hydrogen batteries and lithium ion batteries, so it is impractical to use in those batteries.

Figure 1:
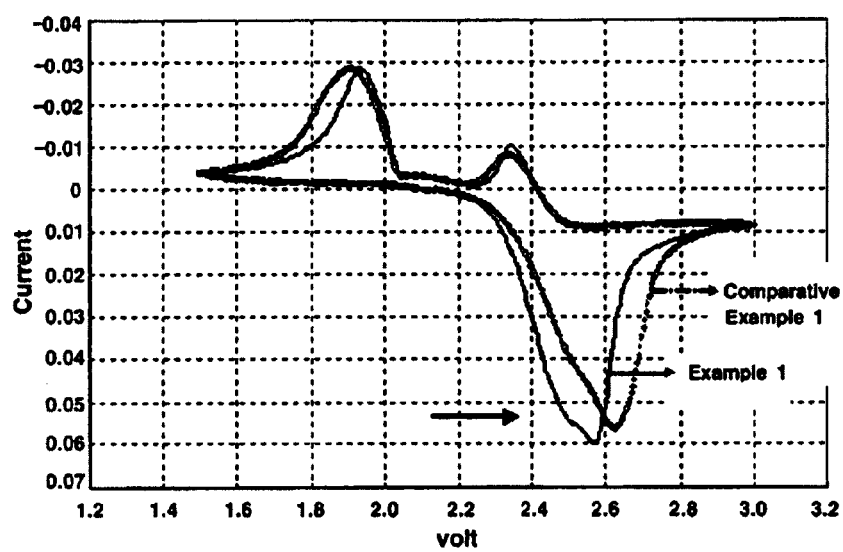
FIG. 1 is a graph showing the cyclic voltametry of positive electrodes for lithium-sulfur cells according to Example 1 of the present invention and Comparative Example 1.

The present inventors confirmed the electrical stability of styrene-butadiene rubber within the working voltages of lithium-sulfur batteries, which have significantly different electrochemical mechanisms and working voltages from the nickel-hydrogen batteries and lithium ion batteries. As a result, the inventors found that the styrene-butadiene rubber is stably presented within the working voltages of the lithium-sulfur batteries, in contrast to the nickel-hydroxide and the lithium ion batteries, as shown in FIG. 1 (Cyclic voltametry), and accomplished the present invention.

Styrene-butadiene rubber has the required physical properties for use as a binder in lithium-sulfur batteries: good adherence, no reaction with electrolytes, no swelling by electrolytes, no immersion with electrolytes, and no interruption of mobility of the discharging product, polysulfide. However, useful binders of the present invention include a styrene-based rubber, such as styrene-butadiene rubber, and styrene-ethylene-butylene-styrene rubber, of which, styrene-butadiene rubber is preferred. The weight ratio of the styrene and butadiene in the styrene-butadiene rubber is 2 to 70:30 to 98. Such a weight ratio allows the binder to have a desired elasticity (i.e., to be rubbery), and to retain the desired adhesion properties.

The positive electrode of the present invention includes an agent which increases viscosity. The agent imparts the viscosity and ionic conductivity to the styrene-butadiene rubber. The agent (hereinafter, referred to as a "viscosity-increasing agent") is a cellulose-based compound, an ionically conductive polymer, or a mixture thereof according to an aspect of the invention.

The cellulose-based compounds include an alkali metal salt-included cellulose, such as carboxymethyl cellulose-alkali metal salt, hydroxypropylmethyl cellulose-alkali metal salt, or methyl cellulose-alkali metal salt. The alkali metal salt may be Na, K, or Li. Alternatively, the cellulose-based compounds include an $NH_4$-included cellulose such as carboxymethyl cellulose-$NH_4$, hydroxypropylmethyl cellulose-$NH_4$, or methyl cellulose-$NH_4$.

The alkali metal salt or $NH_4$-included cellulose is a conductor. Thus, the alkali metal salt or $NH_4$ can prevent shortcomings of cellulose-based compounds which are otherwise insulating without an alkali metal salt or $NH_4$. The insulating property otherwise decreases the routes for transferring electrons and ions and increases the internal resistance of the battery, thereby deteriorating the discharge characteristic at high rates.

The ionically conductive polymers include polyethylene oxide, polyacrylamide, polyvinylpyrrolidone, polyvinyl alcohol, or poly(acrylamide-co-diallyldimethylammonium chloride).

According to an aspect of the invention, the binder is in the amount of 0.5 to 30 wt % based on the total weight of a mixture of the positive active material, the binder and the conductive material, and the optional viscosity-increasing agent in the positive electrode. Hereinafter, the positive active material, the binder and the conductive material, and the optional viscosity-increasing agent will be collectively referred to as a "positive active mass." If the amount of the binder is less than 0.5 wt %, the active material and the conductive material are easily separated from the collector. Whereas if the amount of the binder is more than 30 wt %, the amount of the active material is relatively reduced, thereby decreasing capacity.

According to an aspect of the invention, the viscosity-increasing agent is in the amount of 0.2 to 28 wt % of the positive active mass. If the amount of the viscosity-increasing agent is less than 0.2 wt %, the viscosity of the active material composition is too low to coat the composition on the collector. If the amount of the viscosity-increasing agent is more that 28 wt %, the extremely high viscosity makes it difficult to coat on the collector.

According to aspects of the invention, if both the cellulose-based compound and the ionically conductive polymer are used as the viscosity-increasing agent, the weight ratio of the cellulose-based compound:the ionically conductive polymer is 0.1 to 8:0.1 to 20. If the styrene-butadiene rubber binder and the cellulose-based compound are used, the weight ratio of the styrene-butadiene rubber:cellulose-based compound is preferably 66.7 to 80:20 to 33.3. If the styrene-butadiene rubber binder and the ionically conductive polymer are used, the weight ratio of the styrene-butadiene rubber:ionically conductive polymer is 20 to 40:60 to 80. If the styrene-butadiene rubber binder, the cellulose-based compound and the ionically conductive polymer agent are used, the weight ratio of styrene-butadiene rubber:cellulose-based compound:ionically conductive polymer is 23.1:42.9: 7.7 to 14.3:42.9 to 69.2. If the amount of the cellulose-based compound is out of the above range, the discharge capacity decreases.

According to an embodiment of the invention, a positive electrode is prepared as follows. A positive active material, an electrically conductive material, and a binder are mixed in an appropriated solvent to form a positive active material composition in the form of a slurry. Optionally, the viscosity-increasing agent may be further added to the solvent. The positive active material may include elemental sulfur ($S_8$), $Li_2S_n$ ($n \geq 1$), an organo-sulfur compound, or a carbon-sulfur polymer (($C_2S_x$)$_n$, where x=2.5 to 10, $n \geq 2$).

The electrically conductive material permits electrons to move between the active material and the electrically conductive material. The conductive material is any compound capable of moving electrons. According to an aspect of the invention, the material is one or a mixture of conductive materials including carbon powder such as active carbon (e.g., SUPER-P), carbon black, ketjen black, or metal powder such as Ni, Co, Cu, Pt, Ag, Au or alloy thereof; and a conductive polymer such as polyaniline, polythiophene, polyacetylene, or polypyrrole.

Any solvent may be used as long as the solvent homogeneously disperses the positive active material, the binder, and the conductive material, and is easily evaporated. Useful solvents include, but are not limited to, acetonitrile, methanol, ethanol, tetrahydrofurane, water, and isopropyl alcohol.

The positive active material composition is coated on a current collector to produce a positive electrode. The current collector is not limited to any particular type, but is preferably made of a conductive material such as stainless steel, aluminum, copper, or titanium. It is more preferable to use a carbon-coated aluminum current collector. The carbon-coated aluminum current collector has excellent adhesive properties to the coated layer including positive materials, shows a lower contact resistance, and inhibits corrosion due to polysulfide better than a bare aluminum current collector.

Hereinafter, the present invention will be explained in detail with reference to examples. These examples, however, should not in any sense be interpreted as limiting the scope of the present invention.

COMPARATIVE EXAMPLE 1

60 wt % of elemental sulfur ($S_8$), 20 wt % of ketjen black (MITSUBISHI) and 20 wt % of polyethyleneoxide were well mixed in an acrylonitrile solvent to prepare a slurry. Sublimed sulfur available from ALDRICH CO. was used as the elemental sulfur. The slurry was coated on a current collector (carbon-coated Al current collector), which was then dried to produce a positive electrode.

Using the positive electrode, a lithium foil negative electrode, and a polypropylene separator, a lithium-sulfur cell was fabricated in a dry room. 1 M $LiSO_3CF_3$ in a mixture of 1,3-dioxolane/diglyme/sulforane/dimethoxy ethane (5:2:1:2 volume ratio) was used as an electrolyte.

EXAMPLE 1

Sublimed sulfur available from ALDRICH CO., was used as a positive active material. The positive active material, a ketjen black (MITSUBISHI, CO.) conductive material and a binder were mixed in a water solvent with a ball mill to prepare a positive active material slurry. The binder was a mixture of styrene-butadiene rubber:carboxymethyl cellulose-Na. The ratio of the positive active material:the conductive material:the binder was 7:2:1 by weight. The ratio of styrene-butadiene rubber: carboxymethyl cellulose-Na was 4:1 by weight, and the ratio of styrene: butadiene was 25:75.

The slurry was coated on a carbon-coated aluminum current collector (Rexam substrate) with a doctor blade to produce a positive electrode. The theoretical energy density of the positive electrode was set to 2 mAh/cm$^2$.

Using the positive electrode, and a negative electrode of a lithium foil with a thickness of 130 μm, a lithium sulfur cell was fabricated in a dry room. 1 M $LiSO_3CF_3$ in a mixture of 1,3-dioxolane, dimethoxy ethane, diglyme, sulforane (5:2:2:1 volume ratio) was used as an electrolyte.

EXAMPLE 2

A pulverized sulfur active material, a carbon conductive material, a styrene-butadiene rubber binder, and a polyethylene oxide agent for increasing viscosity were mixed in a water solvent to prepare a positive active material slurry. The ratio of the positive active material:the conductive material:the binder:the agent for increasing viscosity was 7:2:0.3:0.7 by weight. The weight ratio of the styrene:butadiene was 25:75. The slurry was coated on a carbon-coated aluminum current collector to produce a positive electrode.

Using the positive electrode and a lithium foil negative electrode, a lithium sulfur cell was fabricated in a dry room. 1 M $LiSO_3CF_3$ in a mixture of 1,3-dioxolane, dimethoxy ethane, diglyme and sulforane (5:2:2:1 volume ratio) was used as an electrolyte.

EXAMPLE 3

A lithium sulfur cell was fabricated by the same procedure as in Example 1 except that a styrene-butadiene rubber binder, carboxymethyl cellulose, and polyamide-co-diallyldimethyl-ammonium chloride (PAA) as a viscosity-increasing agent were used. The ratio of the positive active material:the conductive material:the binder:the viscosity-increasing agent was 7:2:0.3:0.7 by weight. The ratio of styrene-butadiene rubber:carboxymethyl cellulose-Na:PAA was 3:1:6 by weight. The weight ratio of styrene:butadiene was 25:75.

EXAMPLE 4

A lithium-sulfur cell was fabricated by the same procedure as in Example 2 except that the ratio of the positive active material:the conductive material:the binder was 5:2:3 by weight.

EXAMPLE 5

Sublimed sulfur, available from ALDRICH, CO., was pulverized for use in a positive electrode. The positive active material, a ketjen black conductive material (MITSUBISHI, CO.), a styrene-butadiene rubber binder, and carboxymethyl cellulose-$NH_4$ as an agent for increasing viscosity were mixed with a ball mill in a water solvent to prepare a positive active material slurry. The weight ratio of the positive active material:the conductive material:the binder:the agent for increasing viscosity was 7:2:0.8:0.2.

The positive active material slurry was coated on a carbon-coated aluminum current collector (Rexam substrate) to produce the positive electrode. Using the positive electrode, and a lithium foil negative electrode, a lithium-sulfur cell was fabricated in a dry room. 1 M $LiSO_3CF_3$ in a mixture of 1,3-dioxolane, dimethoxy ethane, diglyme, sulforane (5:2:2:1 volume ratio) was used as an electrolyte.

REFERENCE EXAMPLE 1

A lithium-sulfur cell was fabricated by the same procedure as in Example 3 except that the weight ratio of styrene-butadiene rubber:carboxymethyl cellulose-Na:PAA was 2:4:4.

The cells according to Examples 1 to 5, Comparative Example 1, and Reference Example 1 were charged and discharged at 0.1C, 0.2C, 0.5C, and 1C. The discharge capacities at each rate were measured, and the results are presented in Table 1. In addition, the discharge capacities per gram of sulfur are presented in Table 2.

TABLE 1

| | Discharge capacity at 0.1C (mAh/ weight of active mass) | Discharge capacity at 0.2C (mAh/ weight of active mass) | Discharge capacity at 0.5C (mAh/ weight of active mass) | Discharge capacity at 1.0C (mAh/ weight of active mass) | Binder + agent for increasing viscosity |
|---|---|---|---|---|---|
| Comparative Example 1 | 793 | 603 | 552 | 459 | PEO |
| Example 1 | 981 | 739 | 672 | 551 | SBR + CMC-Na |
| Example 2 | 981 | 704 | 635 | 559 | SBR + PEO |
| Example 3 | 951 | 753 | 669 | 582 | SBR + (CMC-Na + PAA) |
| Example 4 | 732 | 512 | 460 | 415 | SBR + PEO |
| Example 5 | 921 | 701 | 612 | 501 | SBR + CM-NH$_4$ |
| Reference Example 1 | 774 | 559 | 487 | 422 | SBR + (CMC-Na + PAA) |

TABLE 2

| | Discharge capacity at 0.1C (mAh/g of sulfur) | Discharge capacity at 0.2C (mAh/g of sulfur) | Discharge capacity at 0.5C (mAh/g of sulfur) | Discharge capacity at 1.0C (mAh/g of sulfur) | Binder + agent for increasing viscosity |
|---|---|---|---|---|---|
| Comparative Example 1 | 1322 | 1005 | 920 | 765 | PEO |
| Example 1 | 1401 | 1056 | 960 | 787 | SBR + CMC-Na |
| Example 2 | 1401 | 1006 | 907 | 799 | SBR + PEO |
| Example 3 | 1359 | 1076 | 956 | 831 | SBR + CMC-Na + PAA |
| Example 4 | 1464 | 1024 | 920 | 830 | SBR + PEO |
| Example 5 | 1316 | 1001 | 874 | 716 | SBR + CM-NH$_4$ |
| Reference Example 1 | 1106 | 799 | 696 | 603 | SBR + CNC-Na + PAA |

As shown in Tables 1 and 2, the cells according to Examples 1 to 5 exhibited higher discharge capacities at low and high rates than the cells according to Comparative Example 1. Even though the cell according to Reference Example 1 uses styrene-butadiene rubber, carboxymethyl cellulose-Na, and PAA, like Example 3, the large amount of carboxymethyl cellulose-Na causes a decrease in discharge capacity.

FIG. 1 shows cyclic voltametry of positive electrodes according to Example 1 and Comparative Example 1. The cyclic voltametry indicates that the styrene-butadiene rubber can be used as a binder for lithium-sulfur batteries.

Figure 2:
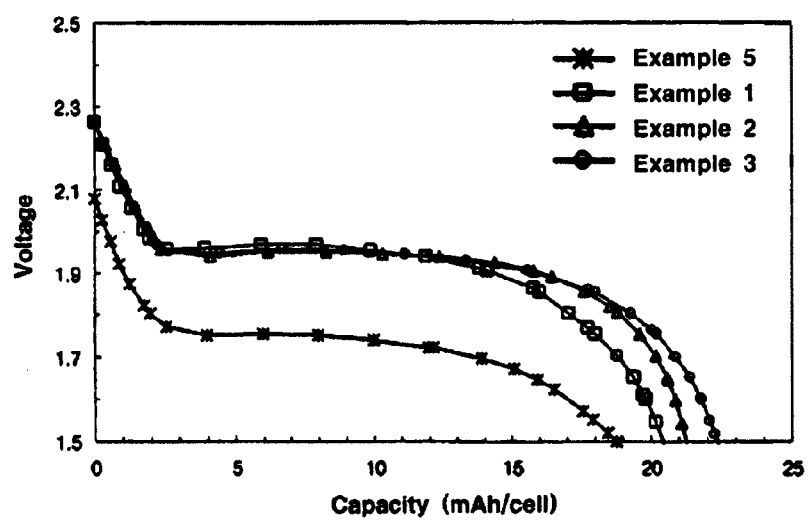
FIG. 2 is a graph showing the charge and discharge characteristic of positive electrodes for lithium-sulfur cells according to Examples 1 to 3, and 5 of the present invention.

The charge and discharge characteristic of the lithium-sulfur cells according to Examples 1 to 3, and Comparative Example 1 were measured and the results are presented in FIG. 2. The lithium-sulfur cells according to Examples 1 to 3 exhibited higher voltage and capacity, when compared to the cells according to Comparative Example 1.

Figure 3:
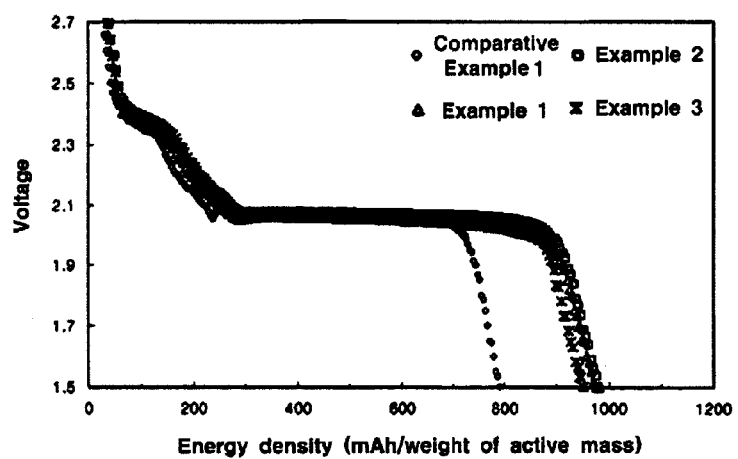
FIG. 3 is a graph illustrating the energy density of positive electrodes for lithium-sulfur cells according to Examples 1 to 3 of the present invention and Comparative Example 1.
Figure 4:
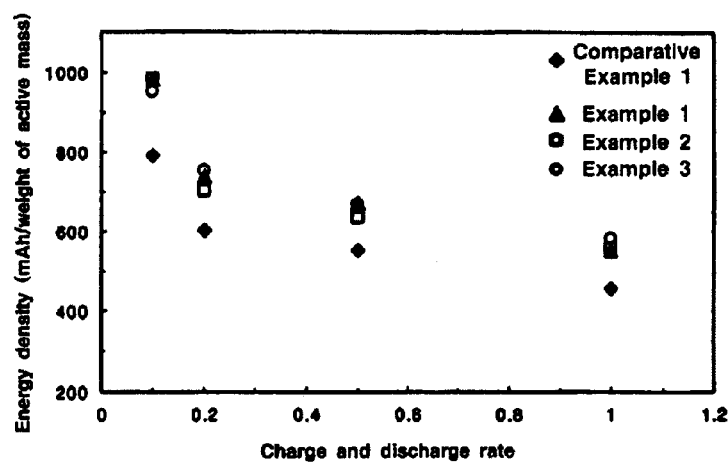
FIG. 4 is a graph showing the energy density at various charging rates of lithium-sulfur cells according to Examples 1 to 3 of the present invention and Comparative Example 1.

The energy densities of the lithium-sulfur batteries according to Examples 1 to 3 and Comparative Example 1 were measured and the results are presented in FIG. 3. In addition, the energy densities of the lithium-sulfur batteries according to Examples 1 to 3 and Comparative 1 at various rates are shown in FIG. 4. It is evident from FIGS. 3 and 4 that the lithium-sulfur batteries according to Examples 1 to 3 exhibited superior energy densities than the batteries according to Comparative Example 1.

Figure 5:
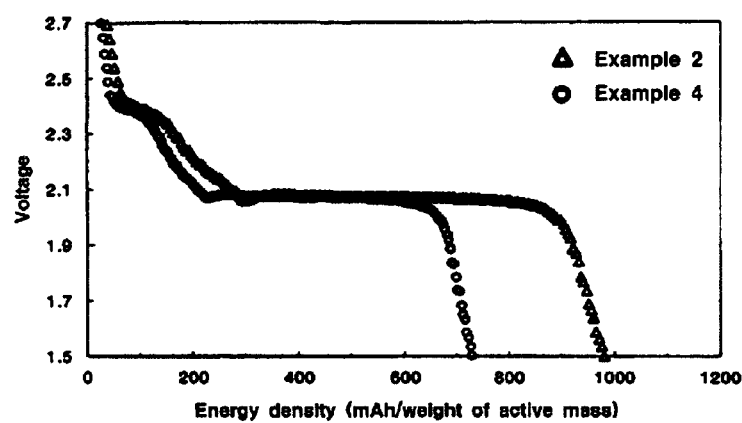
FIG. 5 is a graph showing the discharge characteristic of lithium-sulfur cells according to Examples 2 and 4 of the present invention.
Figure 6:
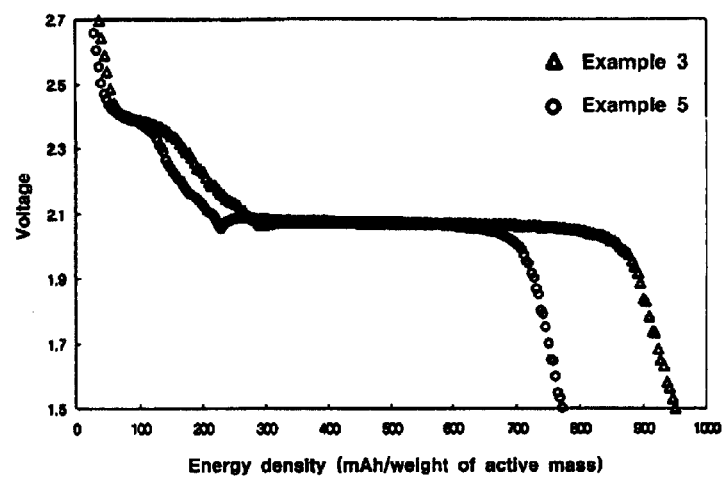
FIG. 6 is a graph illustrating the discharge characteristic of lithium-sulfur cells according to Examples 3 and 4 of the present invention.

FIG. 5 shows the discharge characteristics of the lithium-sulfur batteries according to Examples 2 and 4. FIG. 6 shows the discharge characteristics of the lithium-sulfur batteries according to Examples 3 and 4. From FIGS. 5 and 6, the lithium-sulfur battery according to Example 4 exhibited a good discharge characteristic, the battery according to Example 3 was better, and the battery according to Example 2 was the best.

Figure 7:
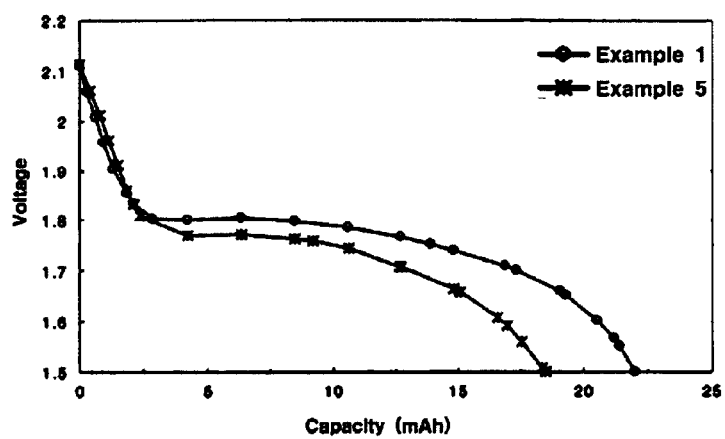
FIG. 7 is a graph illustrating the discharge characteristic of lithium-sulfur cells according to Examples 1 and 5 of the present invention.
Figure 8:
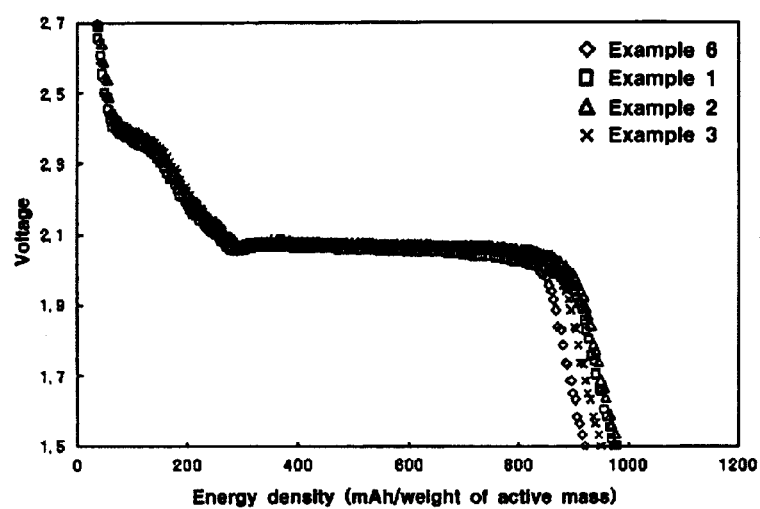
FIG. 8 is a graph illustrating the discharge characteristic of lithium-sulfur cells according to Examples 1 and 5 of the present invention.

The discharge characteristics of the lithium-sulfur batteries according to Examples 1 and 5 were measured, and the results are presented in FIG. 7. Those of the lithium-sulfur batteries according to Examples 1 to 3 and 5 are presented in FIG. 8. It is shown in FIGS. 7 and 8 that the lithium-sulfur batteries according to Examples 1 to 3, and 5 exhibited better discharge characteristics.

The positive electrode of the present invention uses a new binder with excellent adherence and includes a small amount of the binder, thereby increasing the amount of the positive active material and the energy density by 20% or more.

Figure 9:
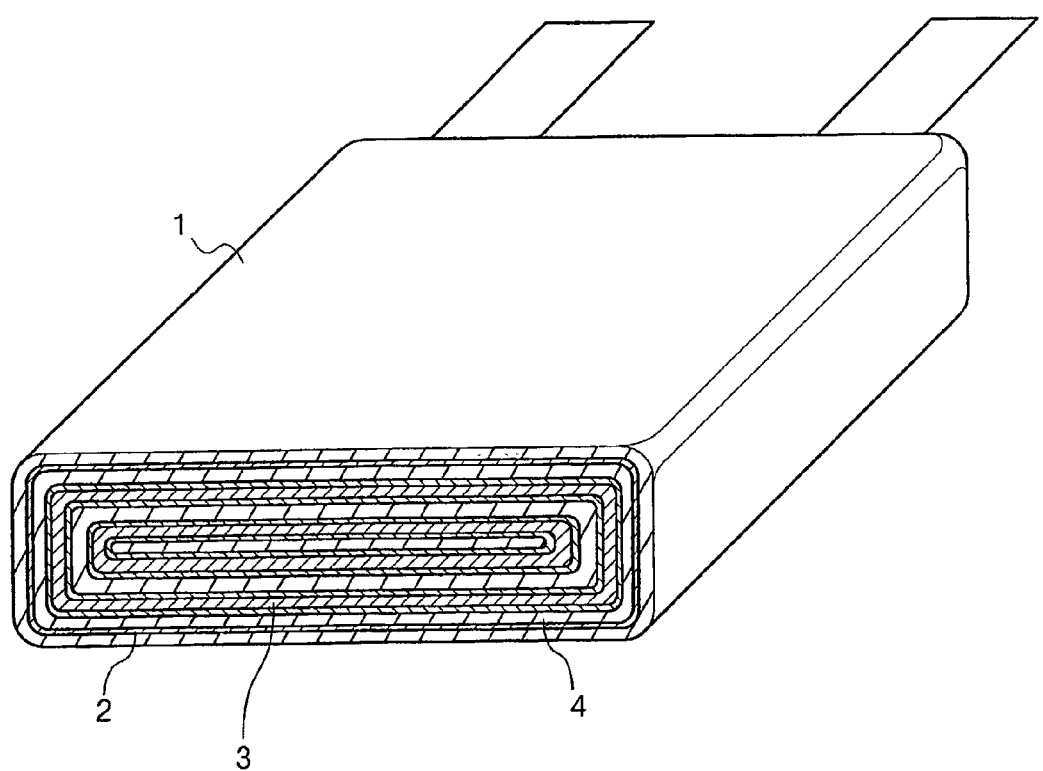
FIG. 9 shows a lithium battery according to an embodiment of the present invention.

A lithium battery according to an embodiment of the invention shown in FIG. 9 includes a case 1 containing a positive electrode 3, a negative electrode 4, and a separator 2 interposed between the positive electrode 3 and the negative electrode 4. An electrolyte is disposed between the positive and negative electrodes 3, 4. The positive electrode 3 includes the binder according to the present invention.

While the present invention has been described in detail with reference to the embodiments, those skilled in the art will appreciate that various modifications and substitutions can be made thereto without departing from the spirit and scope of the present invention as set forth in the accompanying claims and equivalents thereof.

What is claimed is:

1. A positive electrode for a lithium-sulfur battery, comprising:
    a positive active material comprising a sulfur, a sulfur-based compound or a mixture thereof;
    an electrically conductive material; and
    a binder comprising a styrene-based rubber,
        wherein an amount of the binder is 0.5 to 30 wt % based on the total weight of the positive active material, the conductive material, and the binder, and
        wherein the styrene-based rubber is styrene-ethylene-butylene-styrene rubber.
2. The positive electrode of claim 1, wherein the conductive material is a carbon powder or a metal powder.
3. The positive electrode of claim 2, wherein the carbon powder is selected from the group consisting of ketjen black, carbon black, and an active carbon.

4. The positive electrode of claim 1, further comprising a current collector on which is disposed a mass including the positive active material, the conductive material, and the binder.

5. A positive electrode for a lithium-sulfur battery, comprising:
- a positive active material comprising a sulfur, a sulfur-based compound or a mixture thereof;
- an electrically conductive material; and
- a binder comprising a styrene-based rubber, wherein the styrene-based rubber is styrene-butadiene rubber, and the styrene-butadiene rubber includes 2 to 70 wt % of styrene, and 30 to 98 wt % of butadiene.

6. The positive electrode of claim 5, wherein an amount of the binder is 0.5 to 30 wt % based on the total weight of the positive active material, the conductive material, and the binder.

7. A positive electrode for a lithium-sulfur battery, comprising:
- a positive active material comprising a sulfur, a sulfur-based compound or a mixture thereof;
- an electrically conductive material;
- a binder comprising a styrene-based rubber; and
- an agent for increasing viscosity, the agent being selected from the group consisting of a cellulose-based compound, an ionically conductive polymer, and a mixture thereof,
- wherein the cellulose-based compound is selected from the group consisting of a carboxymethyl cellulose-alkali metal salt, a hydroxypropylmethyl cellulose-alkali metal salt, and a methylcellulose-alkali metal salt.

8. The positive electrode of claim 7, wherein the alkali metal is selected from the group consisting of Na, K, and Li.

9. The positive electrode of claim 7, wherein the styrene-based rubber is selected from the group consisting of styrene-butadiene rubber and styrene-ethylene-butylene-styrene rubber.

10. The positive electrode of claim 9, wherein the styrene-based rubber is the styrene-butadiene rubber and includes 2 to 70 wt % of styrene and 30 to 98 wt % of butadiene.

11. The positive electrode of claim 7, wherein the ionically conductive polymer is selected from the group consisting of a polyethylene oxide, a polyacrylamide, a polyvinylpyrrolidone, a polyvinylacetate, and polyacrylamide-co-diallyldimethylammonium chloride.

12. The positive electrode of claim 7, wherein an amount of the binder is 0.5 to 30 wt % based on the total amount of the positive active material, the conductive material, the binder, and the agent.

13. The positive electrode of claim 7, wherein the agent comprises the ionically conductive polymer, and an amount of the ionically conductive polymer is 0.1 to 20 wt % based on the total amount of the positive active material, the conductive material, the binder, and the agent.

14. The positive electrode of claim 7, wherein the conductive material is a carbon powder or a metal powder.

15. The positive electrode of claim 14, wherein the carbon powder is selected from the group consisting of ketjen black, carbon black, and an active carbon.

16. The positive electrode of claim 7, further comprising a current collector on which is disposed a mass including the positive active material, the conductive material, the binder, and the agent.

17. The positive electrode of claim 7, wherein if the cellulose-based compound and the ionically conductive polymer are used as the agent for increasing viscosity, a weight ratio of the cellulose-based compound : the ionically conductive polymer is 0.1 to 8 :0.1 to 20.

18. A positive electrode for a lithium-sulfur battery, comprising:
- a positive active material comprising a sulfur, a sulfur-based compound or a mixture thereof;
- an electrically conductive material;
- a binder comprising a styrene-based rubber; and
- an agent for increasing viscosity, the agent being selected from the group consisting of a cellulose-based compound, an ionically conductive polymer, and a mixture thereof,
- wherein the cellulose-based compound is selected from the group consisting of a carboxymethyl cellulose-$NH_4$, a hydroxypropylmethyl cellulose-$NH_4$, and a methylcellulose-$NH_4$.

19. A positive electrode for a lithium sulfur battery, comprising:
- a positive active material comprising a sulfur, a sulfur-based compound or a mixture thereof;
- an electrically conductive material:
- a binder comprising a styrene-based rubber; and
- an agent for increasing viscosity, the agent being selected from the group consisting of a cellulose-based compound, an ionically conductive polymer, and a mixture thereof,
- wherein the agent comprises the cellulose-based compound, and an amount of the cellulose-based compound is 0.1 to 8 wt % based on the total amount of the positive active material, the conductive material, the binder, and the agent.

* * * * *